(12) United States Patent
Heaton

(10) Patent No.: US 8,682,113 B2
(45) Date of Patent: Mar. 25, 2014

(54) ELECTRO-OPTIC WAVEGUIDE POLARISATION MODULATOR AND A METHOD OF MODULATION

(75) Inventor: John Heaton, Malvern (GB)

(73) Assignee: U2T Photonics UK Limited, London (GB)

( * ) Notice: Subject to any disclaimer, the term of this patent is extended or adjusted under 35 U.S.C. 154(b) by 178 days.

(21) Appl. No.: 13/297,108

(22) Filed: Nov. 15, 2011

(65) Prior Publication Data

US 2012/0148183 A1 Jun. 14, 2012

(51) Int. Cl.
*G02F 1/035* (2006.01)

(52) U.S. Cl.
USPC ........... 385/2; 385/8; 385/11; 385/40; 372/27

(58) Field of Classification Search
USPC ............ 385/2, 8, 9, 11, 39, 40, 50, 129–130; 372/26, 27
See application file for complete search history.

(56) References Cited

U.S. PATENT DOCUMENTS

| 7,283,689 | B1 * | 10/2007 | Block et al. ........................ 385/2 |
| 2002/0021879 | A1 * | 2/2002 | Lee et al. ....................... 385/129 |
| 2008/0298761 | A1 * | 12/2008 | Bond et al. ..................... 385/131 |
| 2010/0040322 | A1 * | 2/2010 | Li et al. ............................. 385/3 |

FOREIGN PATENT DOCUMENTS

| EP | 0455347 A2 | 11/1991 |
| GB | 2441790 A | 3/2008 |
| WO | 2004011995 A1 | 2/2004 |

OTHER PUBLICATIONS

Ranalli et al., "Narrow Bandwidth Electrooptic Polarization Modulator Using GaAs Quantum-Well Waveguides", IEEE Photonics Technology Letters, Apr. 3, 1991, pp. 320-323, vol. 3, No. 4.
Snow et al., "Demonstration of Polarisation Rotation Gate in GaAs/AlGaAs Multiquantum Well Waveguides", Electronic Letters, Dec. 3, 1992, pp. 2346-2348, vol. 28, No. 25.

* cited by examiner

*Primary Examiner* — Ellen Kim
(74) *Attorney, Agent, or Firm* — Howard and Howard Attorneys PLLC

(57) ABSTRACT

An electro-optic waveguide polarization modulator includes cladding layers, and a waveguide core sandwiched between the cladding layers, wherein the waveguide core has a higher refractive index than the cladding layers. The modulator further includes primary electrodes arranged on the opposite side of one cladding layer to the core and a secondary electrode arranged on the opposite side of another cladding layer to the core. The electrodes are arranged to provide an electric field having field components in perpendicular directions within the waveguide core so as to modulate the refractive index such that electromagnetic radiation propagating through the core is converted from a first polarization state to a second polarization state. The modulator further includes a grading layer sandwiched between the cladding layers and the core, the grading layer having an effective refractive index intermediate between that of the waveguide core and the cladding layer.

18 Claims, 6 Drawing Sheets

US 8,682,113 B2

ELECTRO-OPTIC WAVEGUIDE POLARISATION MODULATOR AND A METHOD OF MODULATION

Figure 1:
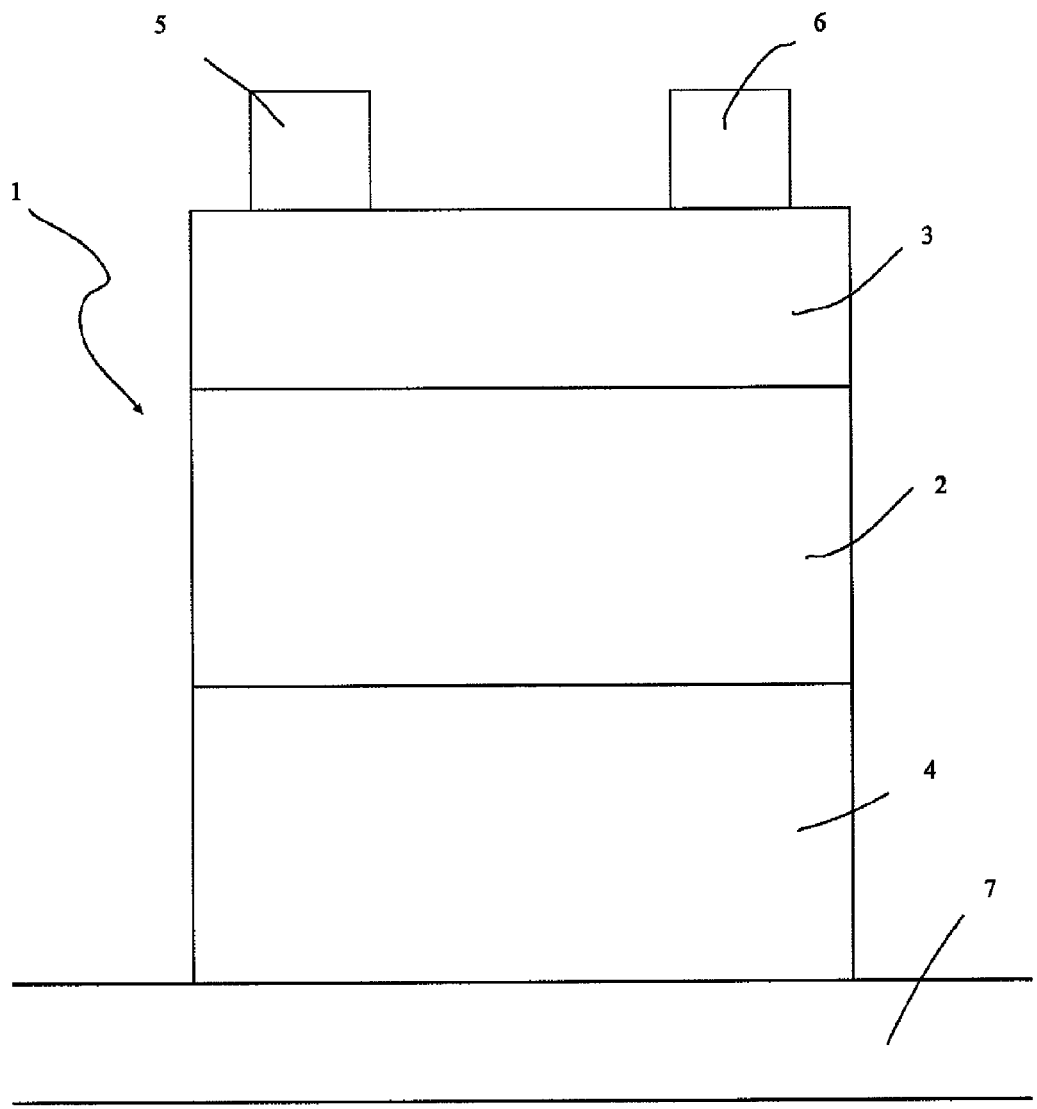

The subject patent application claims priority to and all the benefits of United Kingdom Patent Application No. GB1019204.5, which was filed on Nov. 15, 2010, with The UK Patent Office, the disclosure of which is hereby incorporated by reference.

The present invention relates to an electro-optic polarisation modulator and a method of modulating electromagnetic modulation employing such a modulator. More particularly, but not exclusively, the present invention relates to an electro-optic waveguide polarisation modulator comprising a waveguide core between cladding layers, the cladding layers having a lower refractive index than the core, the modulator further comprising at least one grading layer between waveguide core and at least one cladding layer, the grading layer having a refractive index intermediate between the core and cladding layer. In a further aspect the present invention relates to a method of employing such a modulator to modulate an electromagnetic signal.

Electro-optic waveguide polarisation modulators are known. WO2008/032041 discloses such a modulator. The modulator comprises a waveguide core sandwiched between cladding layers. The cladding layers have a lower refractive index than the core. Arranged on a first cladding layer is a pair of first electrodes. Arranged on the other cladding layer is a second electrode. This device enables the control of the polarisation modes of an incident electromagnetic signal. Its fabrication however is difficult. In order to be effective the first electrodes have to be very close together which is difficult using current processing techniques.

The current invention seeks to overcome the problems of the prior art.

Accordingly, in a first aspect, the present invention provides an electro-optic waveguide polarisation modulator comprising
    first and second spaced apart cladding layers;
    a waveguide core between the first and second cladding layers, the waveguide core having a higher refractive index than the cladding layers;
    a plurality of primary electrodes arranged on the opposite side of the first cladding layer to the core; and,
    at least one secondary electrode arranged on the opposite side of the second cladding layer to the core;
    the electrodes being arranged to provide an electric field having field components in two substantially perpendicular directions within the waveguide core so as to modulate the refractive index thereof such that electromagnetic radiation propagating through the core is converted from a first polarisation state to a second polarisation state;
    characterised in that
    the modulator further comprises at least one grading layer sandwiched between at least one of the first and second cladding layers and the core, the grading layer having an effective refractive index intermediate between that of the waveguide core and the cladding layer.

The introduction of a grading layer allows a wider waveguide to be used with primary electrodes spaced further apart. This eases the fabrication of the modulator.

The modulator can comprise a first grading layer between the waveguide core and the first cladding layer.

The modulator can comprise a second grading layer between the waveguide core and the second cladding layer.

At least one grading layer can comprise a plurality of sublayers of different refractive indexes.

The refractive index of each sub layer can be less than that of the adjacent sublayer closer to the core.

At least one grading layer can have a refractive index which varies through the thickness of the layer.

Preferably, the refractive index of the grading layer decreases smoothly with increasing distance from the waveguide core.

The waveguide core can be GaAs.

The cladding layers can be AlGaAs layers.

The at least one grading layer can be an AlGaAs layer.

Preferably, the AlGaAs grading layer is an $Al_xGa_{1-x}As$ layer, with $0.02 \le x \le 0.25$, preferably with $0.07 \le x \le 0.20$.

The sublayers can be AlGaAs, the sublayers having different Al doping concentrations to each other.

Preferably, one sublayer is $Al_xGa_{1-x}As$ with $0.01 \le x \le 0.10$ and a further sublayer is $Al_yGa_{1-y}As$ with $0.12 \le y \le 0.20$.

The concentration of Al in the AlGaAs grading layer can vary across the thickness of the grading layer.

In a further aspect of the invention there is provided a method of modulating the polarisation of electromagnetic radiation comprising the steps of
    (i) providing an electro-optic waveguide polarisation modulator as claimed in any one of claims 1 to 14;
    (ii) providing electromagnetic radiation having a first polarisation to the waveguide core; and,
    (iii) applying a first voltage $V_1$ between a first primary electrode and at least one secondary electrode and a second voltage $V_2$ different to $V_1$ between a second primary electrode and at least one secondary electrode so as to modulate to refractive index of the waveguide core such that the radiation propagating through the core is converted from the first polarisation to a second polarisation.

Figure 2:
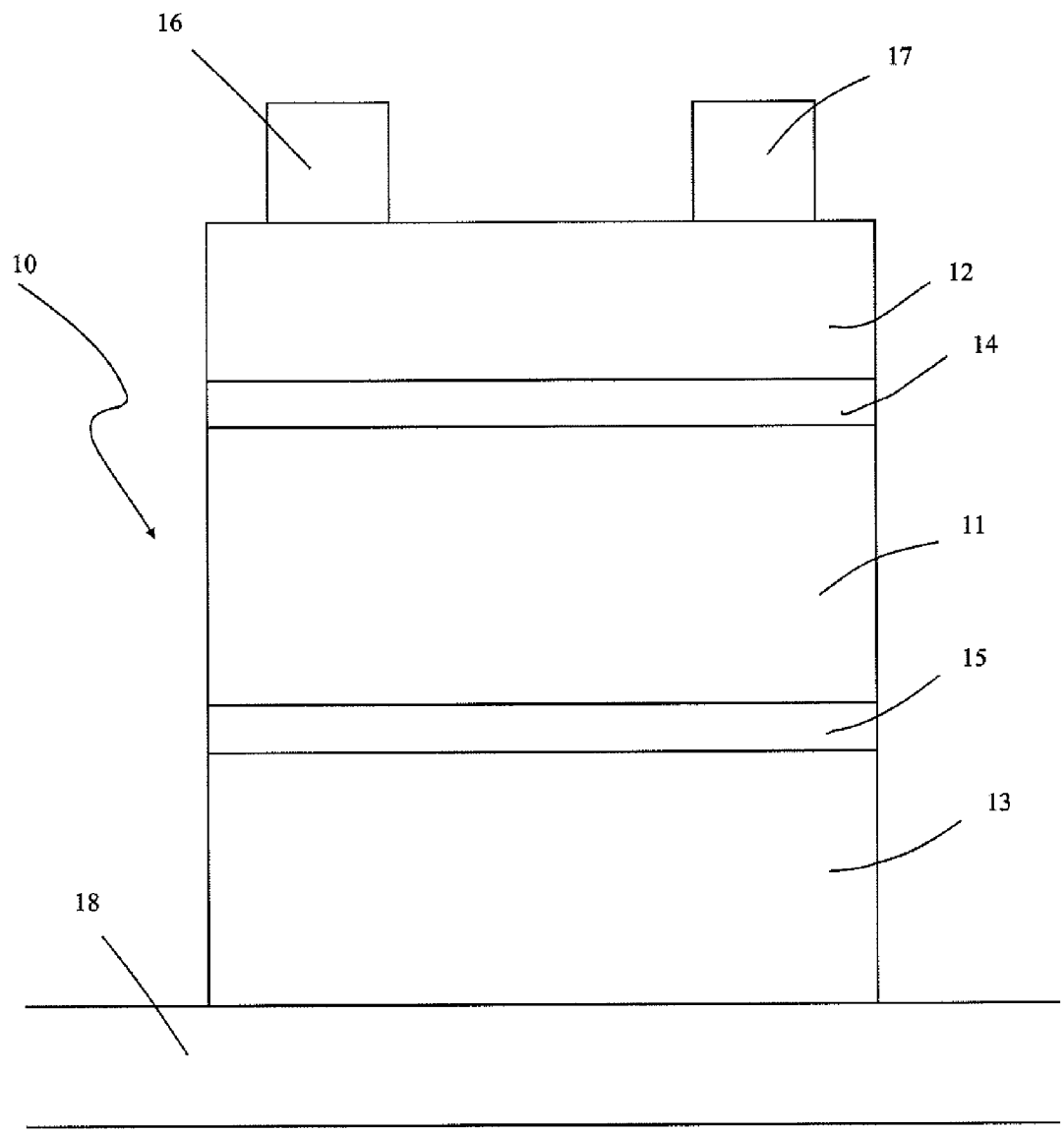
Figure 4:
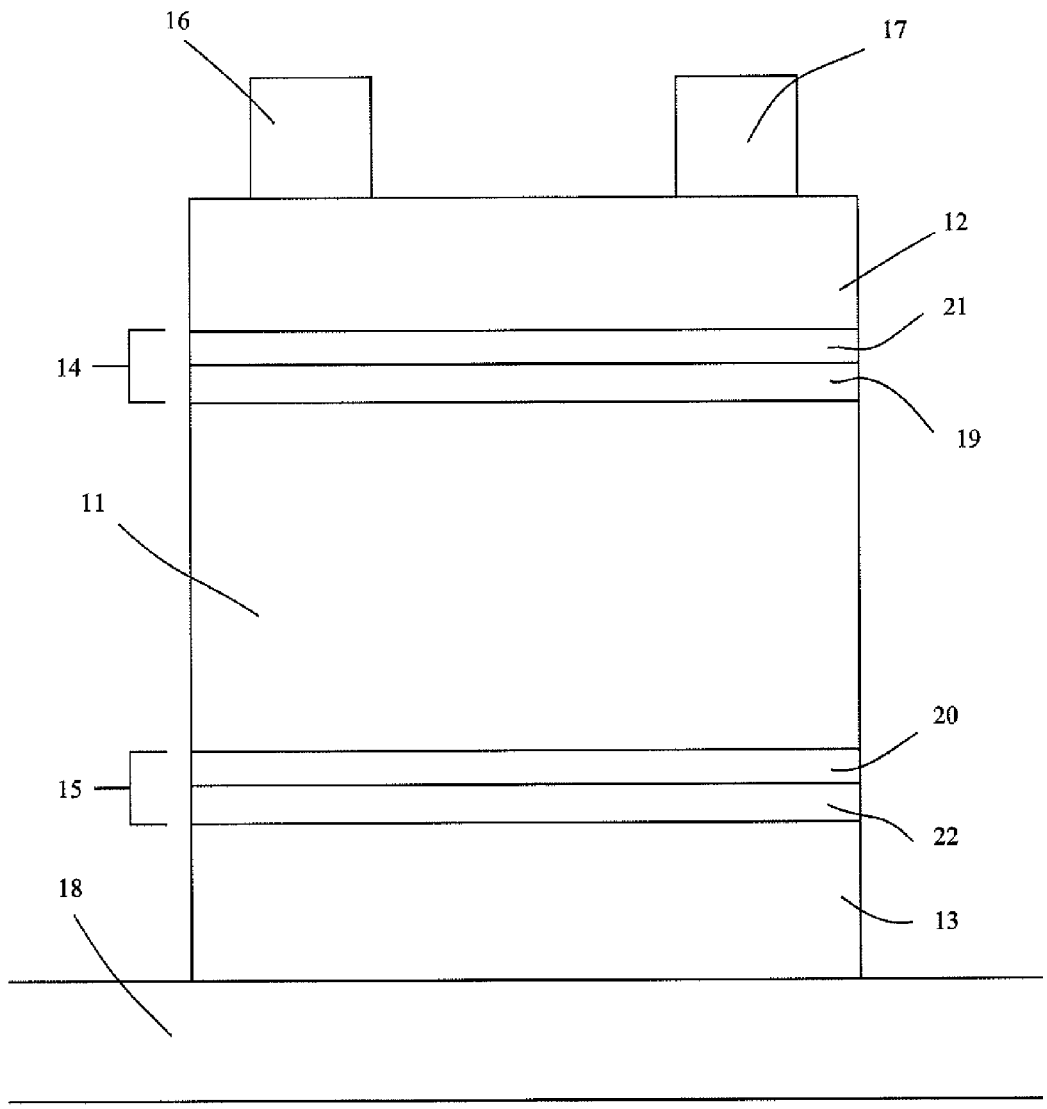
Figure 5:
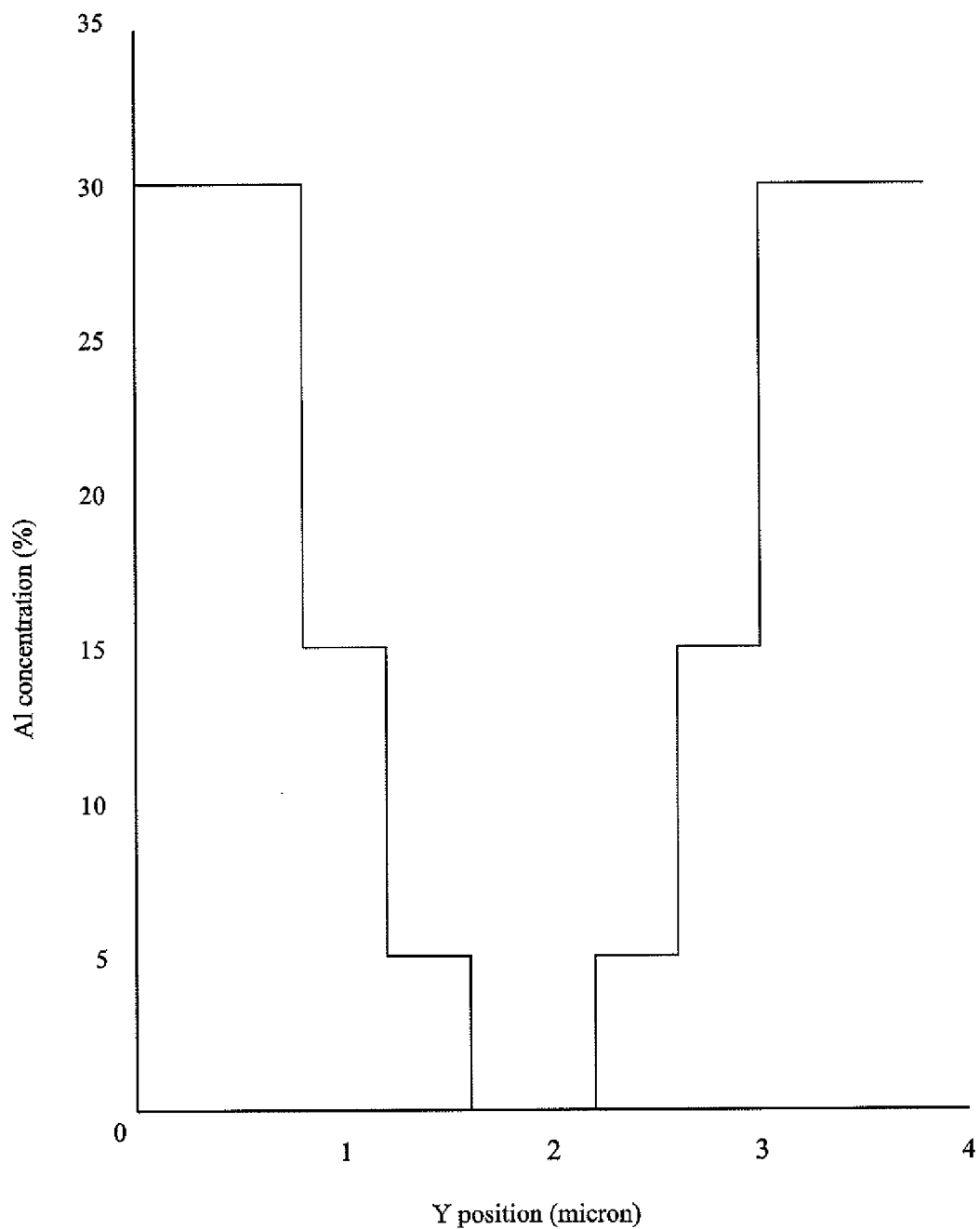

The present invention will now be described by way of example only and not in any limitative sense with reference to the accompanying drawings in which
    FIG. 1 shows a known electro-optic waveguide polarisation modulator in cross section;
    FIG. 2 shows a first embodiment of an electro-optic polarisation modulator according to the invention in cross section;
    FIG. 3 shows the calculated horizontal and vertical fields for modulators with and without grading layers;
    FIG. 4 shows a further embodiment of an electro-optic polarisation modulator according to the invention; and,
    FIG. 5 shows the layer structure for the embodiment of FIG. 4.

Shown in FIG. 1 is a known electro-optic polarisation modulator 1. The modulator 1 comprises a GaAs waveguide core 2. The waveguide core 2 is arranged between top and bottom AlGaAs cladding layers 3,4. The cladding layers 3,4 have a lower refractive index than the core 2.

Arranged on the top cladding layer 3 remote from the core 2 are first and second primary electrodes 5,6. Arranged on the underside of the second cladding layer 4 is a secondary electrode 7.

The operation of this device is described in detail in WO 2008/032048. To briefly summarise, the use of a pair of primary electrodes 5,6 allows control of polarisation conversion by setting up a lateral in addition to a vertical electromagnetic field within the waveguide core 2. The overlap between the TE and TM modes within such a structure however is poor and so in order for the device to be effective the primary electrodes 5,6 have to be very close together. This can be very problematic to manufacture using conventional processing techniques.

Shown in FIG. 2 is an electro-optic waveguide polarisation modulator 10 according to the invention. The optical modulator 10 shown in FIG. 2 comprises a GaAs waveguide core 11. The waveguide core 11 is arranged between first and second AlGaAs cladding layers 12,13. Sandwiched between each of the cladding layers 12,13 and the optical waveguide core 11 are AlGaAs grading layers 14,15. In this particular embodiment the AlGaAs cladding layers 12,13 are $Al_{0.3}Ga_{0.7}As$ layers. The AlGaAs grading layers 14,15 are $Al_{0.15}Ga_{0.85}As$ layers. The refractive index of the waveguide core 11 is higher than that of the cladding layers 12,13. That of the grading layers 14,15 is intermediate between that of the cladding layers 12,13 and the waveguide core 11.

First and second primary electrodes 16,17 are arranged on the first cladding layer 12 on the opposite side to the optical waveguide core 11. A secondary electrode 18 is arranged on the second cladding layer 13 on the opposite side to the waveguide core 11. The electrodes 16,17 are arranged to provide an electric field having field components in two substantially perpendicular directions within the waveguide core 11 so as to modulate the refractive index thereof such that electromagnetic radiation propagating through the core 11 is converted from a first polarisation state to a second polarisation state.

Figure 3A:
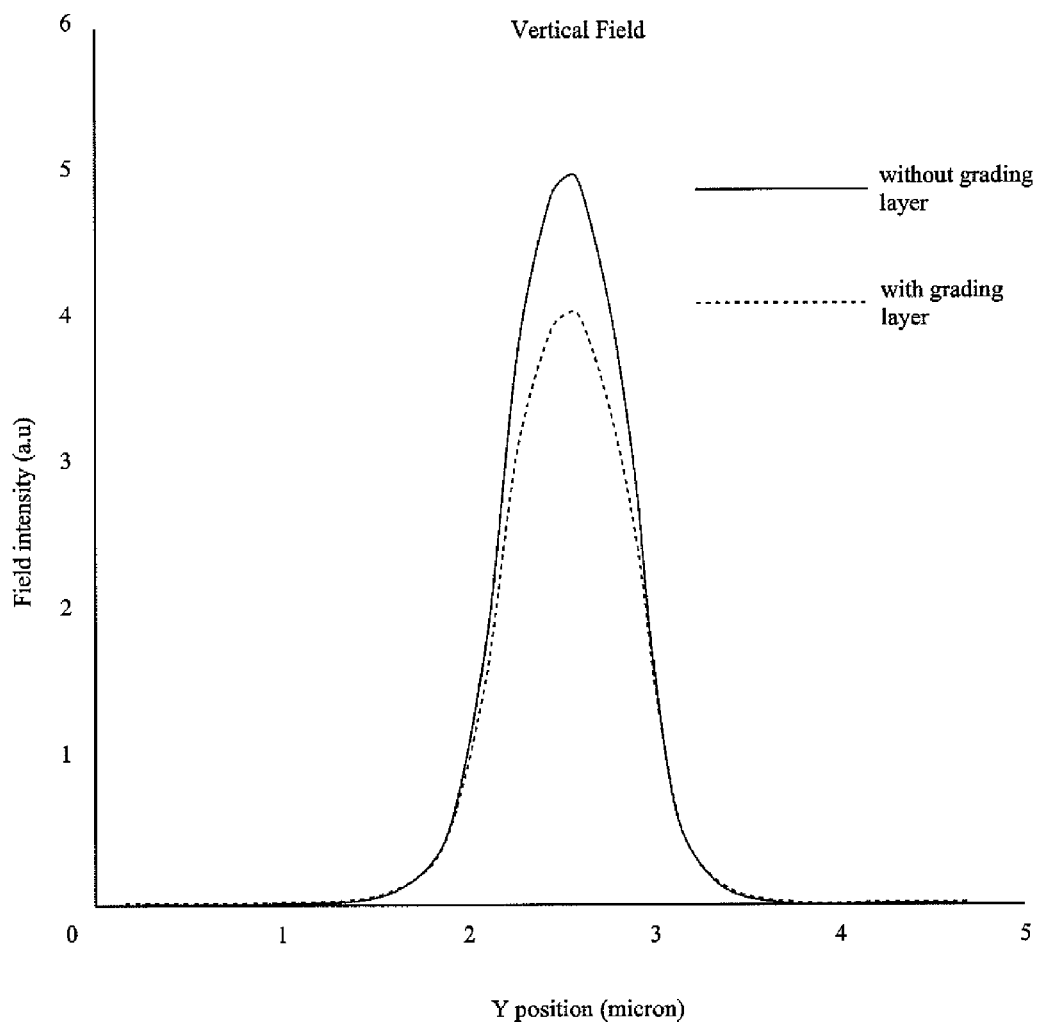
Figure 3B:
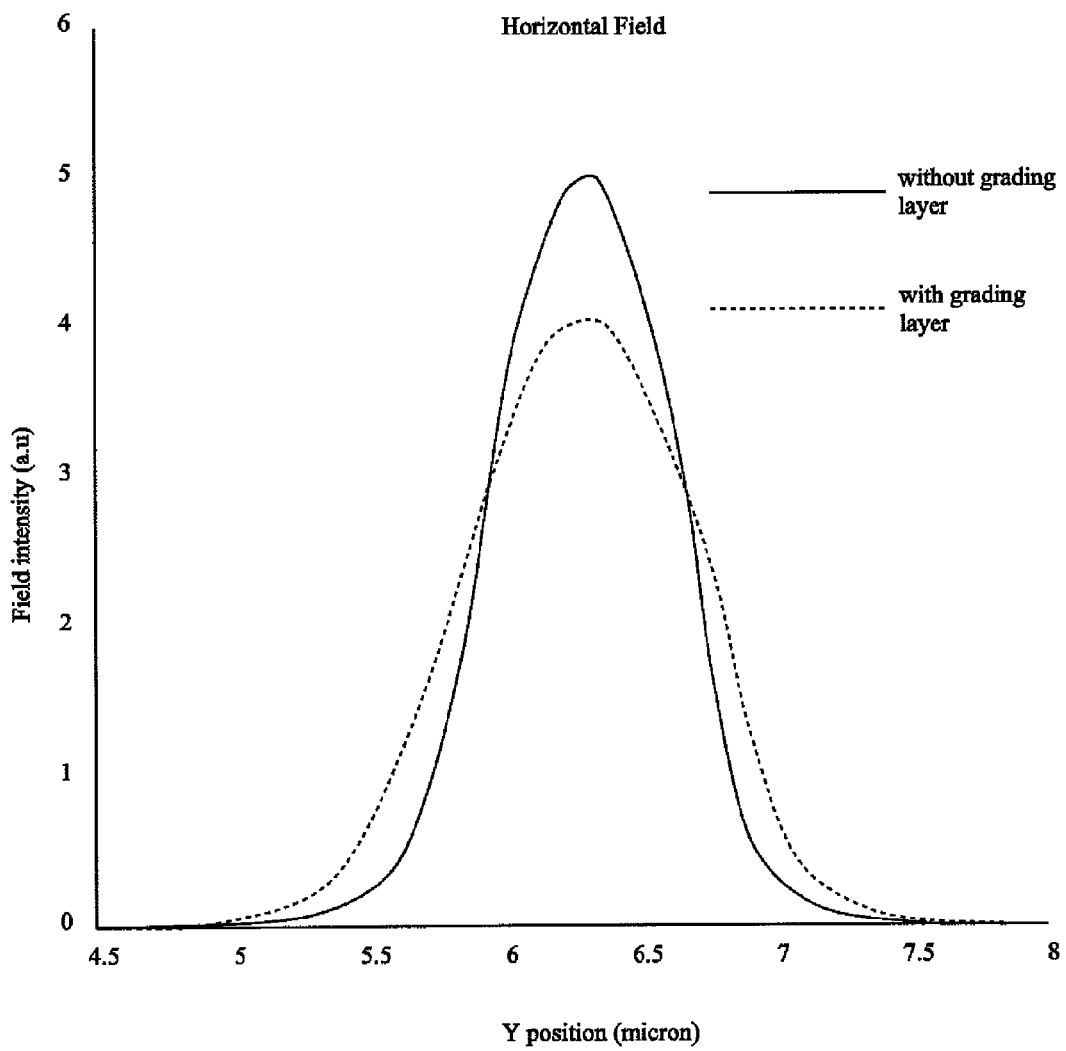

Shown in FIGS. 3(a) and 3(b) are the calculated horizontal and vertical fields for modulators with and without the grading layers 14,15. As can be seen the inclusion of grading layers 14,15 leaves the vertical field substantially unaffected whilst changing that of the horizontal field. The TM eigenmode can therefore be changed without significantly altering the TE eigenmode. By inclusion of grading layers 14,15 one can arrange the TE and TM modes to be sufficiently close to each other such that the two modes remain substantially in phase (to within typically 20 degrees of optical phase difference) within the whole length of the twin electrode guide. As the modes are sufficiently in phase the primary electrodes 16,17 can be set further apart on the modulator 10 and still obtain effective modulation. This significantly increases ease of manufacture of the device.

In the above embodiment the Al concentration in the grading layer 14,15 is 15%. Other concentrations are of course possible. Typical concentrations are in the range 2 to 25%, more particularly 7 to 20%.

In the above embodiment the concentration of the Al in the AlGaAs layer is constant though the thickness of the grading layer 14,15. In an alternative embodiment (not shown) the concentration of the Al in the grading layer 14,15 varies though the thickness of the grading layer 14,15. The concentration of Al increases as the distance from the optical waveguide core 11 increases so decreasing the refractive index. The effective refractive index of the grading layer 14,15 is still intermediate between that of the core 11 and the cladding layers 12,13.

Shown in FIG. 4 is a further embodiment of a modulator 10 according to the invention. In this embodiment each grading layer 14,15 comprises two AlGaAs sublayers—an inner sub layer 19,20 and an outer sublayer 21,22. The outer AlGaAs sublayer 21,22 typically has a higher Al concentration (and so lower refractive index) than the inner sublayer 19,20. This produces a gradual roll off in refractive index from the core 11 to the cladding layers 12,13.

Shown in FIG. 5 is the layer structure for the embodiment of FIG. 4. The cladding layers 12,13 are $Al_{0.3}Ga_{0.7}As$ layers. The outer sublayers 21,22 are $Al_{0.5}Ga_{0.85}As$. The inner sub layers 19,20 are $Al_{0.05}Ga_{0.95}As$. Other concentrations are of course possible. Typically with a two sublayer embodiment the concentration of Aluminium in the inner sublayer 19,20 is in the range 1 to 10% whilst in the outer sublayer 21,22 it is typically in the range 12 to 20%.

In alternative embodiments (not shown) the grading layer 13,14 comprises more than two sublayers. Increasing the number of sublayers increases the smoothness with which the refractive index drops from that of the core 11 to that of the cladding layers 12,13.

In all the above embodiments the layers of the modulator 10 have mirror symmetry about the optical waveguide core 11. The layers on one side of the core 11 are the inverse of the layers on the other side of the core. In alternative embodiments (not shown) the modulator does not have this symmetry. For example in one embodiment the first grading layer 14 between the core 11 and first cladding layer 12 has a different number of sublayers to the second grading layer 15 between the core 11 and second cladding layer 13. The first grading layer 14 could for example have two sublayers whilst the second grading layer 15 has three sublayers. In an alternative embodiment (not shown) one grading layer 14,15 is a single layer of constant Al doping whilst the other grading layer 14,15 is a single layer of varying Al doping. In an alternative embodiment one grading layer is a single layer of variable doping whilst the other grading layer comprises a plurality of sublayers of different dopings.

In further embodiments (not shown) the modulator 10 comprises only one grading layer, either the first grading layer 14 or the second grading layer 15. The single grading layer may be a layer of constant Al doping. The grading layer may comprise a plurality of sublayers each of different Al doping. In a further embodiment the grading layer has an Al doping which varies through the thickness of the layer.

In use an electromagnetic signal having a first polarisation is provided to the optical core 11. A first voltage $V_1$ is provided between the first primary electrode 16 and the secondary electrode 18. A second voltage $V_2$ different to $V_1$ is provided between the second primary electrode 17 and the secondary electrode 18. These voltages modulate the refractive index of the waveguide core such that the electromagnetic signal is converted from the first polarisation to a second polarisation.

In use the optical modulator 10 is part of a larger optical system. Typical systems include telecommunications systems and also systems used in quantum cryptography applications.

The operation of the device will now be further explained in a non-limiting sense.

In a waveguide of width W, the effective refractive index of the TM mode is higher than the effective refractive index of the TE mode when $W>W_0$ and lower when $W<W_0$. $W_0$ is a special guide width at which the effective indices of the two different modes are the same.

For a guide of width $W_0$ light launched into the TE mode can be converted into the TM mode with 100% conversion efficiency because the two modes are accurately in phase along the length of the polarisation converting waveguide. For any other guide width the modes do not remain in phase and so cannot be converted one to the other with 100% efficiency.

For any guide width, light will only convert from TE polarisation to TM if there is a mechanism for coupling the two polarisations together. In practice this could be because the guide is not completely symmetric about a vertical mirror plane through the center of the guide. The guide might be slanted to give a parallelogram shape for example.

Another coupling mechanism is a horizontal applied electric field $E_h$ which changes the refractive indices of plane polarised light polarised in the +45° plane relative to plane polarised light polarised in the −45° plane (leaving the effective indices of the TE (0°) and TM) (90°) polarisations unchanged).

For a guide width $W_0$, the TE and TM modes are degenerate (have the same effective refractive indices) if there is no horizontal field applied. There is no reason to prefer TE or TM polarised modes to any other polarised modes (±45° plane, elliptic or circular).

However, when a horizontal field is applied the +45° plane polarised mode and the −45° plane polarised mode become non-degenerate (their effective indices change from being the same to being different). Light launched into the guide in a TE polarisation (0°) can be described as the sum of these two ±45° polarised modes as (Mode +45°+Mode −45°)/√2, which corresponds to TM light. The polarisation has been converted from TE to TM with 100% efficiency.

If the width is not $W_o$ and a horizontal field is applied, the two polarisation modes which become non-degenerate are not polarised at +45° and so 100% conversion efficiency cannot be achieved.

The vertical field $E_v$ changes the effective refractive index of the TE mode relative to the effective refractive index of the TM mode. This has the effect of changing the guide width $W_o$ at which the TE and TM indices are the same.

When manufacturing optical waveguide devices which include this type of polarisation converter it is difficult to make the polarisation converter guide reliably with the exact width $W_o$ and so it is very useful to be able to apply a vertical field to effectively adjust the value of $W_o$ to match that of the fabricated guide (which may be different for each device made depending on the precision of the fabricated process).

In such a manufactured component, 100% conversion is achieved by applying a vertical field to the device to set $W_o$ to the actual width of the guide and then applying a horizontal field to convert the polarisation. The horizontal field required will depend on the length of the polarisation converter electrodes and might typically be 8V for a 3 cm long converter.

In practice the width of the guide required may be too small to fabricate reliably because of the limits of the lithographic process used to define the waveguides. Use of a grading layer according to the invention enables the critical width $W_o$ to be increased so easing manufacture.

The invention claimed is:

1. An electro-optic waveguide polarisation modulator comprising:
   first and second spaced apart cladding layers;
   a waveguide core between the first and second cladding layers, the waveguide core having a higher refractive index than the cladding layers;
   a plurality of primary electrodes arranged on the opposite side of the first cladding layer to the core;
   at least one secondary electrode arranged on the opposite side of the second cladding layer to the core;
   wherein the electrodes are arranged to provide an electric field having field components in two substantially perpendicular directions within the waveguide core so as to modulate the refractive index thereof such that electromagnetic radiation propagating through the core is converted from a first polarisation state to a second polarisation state; and
   at least one grading layer sandwiched between at least one of the first and second cladding layers and the core, the grading layer having an effective refractive index intermediate between that of the waveguide core and the cladding layer.

2. A modulator as claimed in claim 1, comprising a first grading layer between the waveguide core and the first cladding layer.

3. A modulator as claimed in claim 2, comprising a second grading layer between the waveguide core and the second cladding layer.

4. A modulator as claimed in claim 1, wherein at least one grading layer comprises a plurality of sublayers of different refractive indexes.

5. A modulator as claimed in claim 4, wherein the refractive index of each sub layer is less than that of the adjacent sublayer closer to the core.

6. A modulator as claimed in claim 1, wherein at least one grading layer has a refractive index which varies smoothly through a thickness of the layer.

7. A modulator as claimed in claim 1, wherein the refractive index of the grading layer decreases with increasing distance from the waveguide core.

8. A modulator as claimed in claim 1, wherein the waveguide core is GaAs.

9. A modulator as claimed in claim 1, wherein the cladding layers are AlGaAs layers.

10. A modulator as claimed in claim 1, wherein the at least one grading layer is an AlGaAs layer.

11. A modulator as claimed in claim 10, wherein the AlGaAs grading layer is an $Al_xGa_{1-x}As$ layer, with $0.02 \leq x \leq 0.25$.

12. A modulator as claimed in claim 10, wherein at least one grading layer comprises a plurality of sublayers of different refractive indexes and wherein the sublayers are AlGaAs having different Al doping concentrations to each other.

13. A modulator as claimed in claim 12, wherein at least one of the sublayers is $Al_xGa_{1-x}As$ with $0.01 \leq x \geq 0.10$ and a at least another of the sublayers is $Al_yGa_{1-y}As$ with $0.12 \leq y \leq 0.20$.

14. A modulator as claimed in claim 10, wherein the concentration of Al in the AlGaAs layer varies across thickness of the grading layer.

15. A method of modulating the polarisation of electromagnetic radiation comprising the steps of:
   providing an electro-optic waveguide polarisation modulator, the electro-optic polarisation modulator including:
      first and second spaced apart cladding layers;
      a waveguide core between the first and second cladding layers, the waveguide core having a higher refractive index than the cladding layers;
      a plurality of primary electrodes arranged on the opposite side of the first cladding layer to the core;
      at least one secondary electrode arranged on the opposite side of the second cladding layer to the core;
      wherein the electrodes are arranged to provide an electric field having field components in two substantially perpendicular directions within the waveguide core so as to modulate the refractive index thereof such that electromagnetic radiation propagating through the core is converted from a first polarisation state to a second polarisation state; and,
      at least one grading layer sandwiched between at least one of the first and second cladding layers and the core, the grading layer having an effective refractive index intermediate between that of the waveguide core and the cladding layer;
   providing electromagnetic radiation having a first polarisation to the waveguide core; and,
   applying a first voltage between a first primary electrode and at least one secondary electrode, and a second voltage different to the first voltage between a second primary electrode and the at least one secondary electrode so as to modulate a refractive index of the waveguide core such that the radiation propagating through the core is converted from the first polarisation to a second polarisation.

16. A modulator as claimed in claim 1, comprising a second grading layer between the waveguide core and the second cladding layer.

17. A modulator as claimed in claim 4, wherein the AlGaAs grading layer is an $Al_xGa_{1-x}As$ layer, with $0.07 \leq x \leq 0.20$.

18. A modulator as claimed in claim 3, wherein the refractive index of the grading layers decreases with increasing distance from the waveguide core.

* * * * *

UNITED STATES PATENT AND TRADEMARK OFFICE
CERTIFICATE OF CORRECTION

PATENT NO. : 8,682,113 B2
APPLICATION NO. : 13/297108
DATED : March 25, 2014
INVENTOR(S) : John Heaton It is certified that error appears in the above-identified patent and that said Letters Patent is hereby corrected as shown below:

IN THE CLAIMS:

Column 6 Line 34: Please delete "with $0.01 \leq x \geq 0.10$" and insert: -- with $0.01 \leq x \leq 0.10$ --.

Signed and Sealed this
Twenty-second Day of July, 2014

Michelle K. Lee
*Deputy Director of the United States Patent and Trademark Office*